United States Patent Office 3,545,952
Patented Dec. 8, 1970

3,545,952
GREEN GLASS MANUFACTURE
Malcolm A. Conrad, Sylvania, Ohio, assignor to Owens-Illinois, Inc., a corporation of Ohio
No Drawing. Filed Dec. 18, 1967, Ser. No. 691,149
Int. Cl. C03b 5/16
U.S. Cl. 65—121                      13 Claims

ABSTRACT OF THE DISCLOSURE

An improvement in forehearth addition techniques for producing green-colored glass, wherein the coloring agent consists essentially of chromic oxide and calcium oxide, the generally contemplated range of chromic oxide being about 26–56 percent by weight, and the preferred range being about 46–53 weight percent.

BACKGROUND OF THE INVENTION

This invention relates to the manufacture of colored glass; more particularly, it relates to the manufacture of glasses having a green color as the result of the addition of a highly enriched colorant to a colorless molten base glass in the forehearth section of a conventional glass manufacturing system.

As exemplified by U.S. Pat. Nos. 2,916,387; 2,923,636 and 3,024,121 respectively, it is old in the art of glass manufacturing to add a color-bearing material to a colorless molten base glass for purposes of producing a colored glass which ultimately will be formed into containers such as bottles for soft drinks and other beverages. Typically, when a green-colored glass is to be produced, chromic oxide ($Cr_2O_3$) is the colorant most commonly employed. The addition of this compound by forehearth addition techniques has heretofore been accomplished by either adding the metallic oxide per se to the base glass, or adding a siliceous frit to the base glass wherein the chromic oxide represents a minor porportion of this frit composition.

Direct addition of the colorant metal oxide to a stream of molten glass, as in the forehearth for example, or to any pool of molten glass, has generally been ineffective because the oxide does not liquify or dissolve sufficiently rapidly to produce a uniform, colored glass mixture in the time and space available prior to its delivery to a point of use. Glass generally has an extremely low solubility for color-imparting metallic oxides. This characteristic of low solubility in glass is especially true of chromic oxide, wherein the limit of solubility is about 1¼ to 1½ weight percent. Moreover, as chromic oxide has a liquidus temperature of about 2000° C., it does not sufficiently liquify at normal glass making temperatures to allow its economical use as a colorant.

In attempts to circumvent the foregoing deficiencies, siliceous frit compositions have been developed which incorporate the colorant chromic oxide therein. Unfortunately, the foregoing deficiencies have not been eliminated but are only transferred to the frit manufacturing operation; that is, the frit inherently contains only minute proportions of chromic oxide. Moreover, in employing these compositions other operational shortcomings result. Because of the minute color concentrations, large quantities of these materials are required to produce to desired color depth in the final glass product. These large quantities, in addition to creating materials handling problems, when introduced as a solid substance into the forehearth absorb large quantities of heat and result in a disadvantageous decrease in the temperature of the molten glass. Thus, the thermal conditioning of the glass immediately prior to use is adversely affected.

From the foregoing it can be readily appreciated that, for commercial operations, it would be highly desirable to utilize a colorant which is sufficiently concentrated so as to require the addition to a molten base glass of only relatively small quantities of colorant to produce the requisite depth of coloration in the final glass product, and without serious disruption of its thermal conditioning.

SUMMARY OF THE INVENTION

In accordance with this invention, there is provided an improvement in forehearth coloration techniques, wherein a colorant concentrate is utilized having beneficial melting and solution characteristics and thereby requiring only the addition of small quantities of the concentrate to obtain a desired color depth.

More particularly, there is employed in accordance with this invention a synthesized, or prereacted, color concentrate consisting essentially of chromic oxide and an alkaline-earth oxide, where in its broadest scope, the chromic oxides reside in about 22–57 percent by weight, in its narrower scope comprises about 46–53 percent; the preferred compositions consisting essentially of about 48 percent chromic oxide and 52 percent alkaline-earth oxide.

THE INVENTION

The conditions and procedures for making a molten base glass are conventional, such procedures and conditions representing no part of this invention. Similarly, the addition of colorants to a molten base glass as it flows through the forehearth section of a manufacturing system to produce a homogeneous colored glass is old in the art. Summarily stated, the foregoing techniques employ a tank furnace in which a base glass is melted and refined, the tank being in fluid communication with a forehearth, or plurality of forehearths, whereby the melted glass, hereinafter termed molten base glass, flows to a suitable glass discharge mechanism. As seen, for example, in U.S. Pat. No. 3,024,121 the colorant may be added from a hopper to the molten base glass as it flows through the forehearth, provisions of course being made for the intermixing of the colorant and base glass to produce a homogeneous uniformly colored glass as the final product.

The base glass preferably used in practicing the present invention is essentially a conventional glass of the type commonly utilized in the manufacture of colorless glass containers. Following are the oxide ranges of a typical soda-lime-silicate composition which may be employed as the base glass, the ranges being given in weight percent.

TABLE I

| Oxide: | Percent by weight |
|---|---|
| $SiO_2$ | 60–75 |
| $Al_2O_3$ | .3–10 |
| $CaO+MgO$ | 3–15 |
| $Na_2O$ | 12–18 |
| $K_2O$ | .0–5 |
| $BaO$ | .0–5 |

In preparing the colorant concentrate compositions which are employed in the practice of this invention, exemplary compositions of which are shown in Table 2, commercially available ingredients have been used. Chromic oxide ($Cr_2O_3$) suitable for the preparation of the colorant concentrates contemplated in this invention may be procured from J. T. Baker Chemical Company (Phillipsburg, N.J.) and is identified in their Laboratory Chemicals Catalog No. 660 (1967) as compound No. 1616. Suitable calcium oxide (CaO) may be obtained from Fischer Scientific Co. (Pittsburgh, Pa.), identified as C–117 in the Fischer Chemical Index–67–C (1967).

TABLE 2 (PERCENT BY WEIGHT)

| Sample No. | Percent Cr₂O₃ | Percent CaO | Approx. liquidus temperature, °C. |
|---|---|---|---|
| 1 | 22 | 78 | 1,500 |
| 2 | 26 | 74 | 1,400 |
| 3 | 36 | 64 | 1,300 |
| 4 | 46 | 54 | 1,170 |
| 5 | 48 | 52 | 1,230 |
| 6 | 53 | 47 | 1,020 |
| 7 | 55 | 45 | 1,050 |
| 8 | 56 | 44 | 1,400 |
| 9 | 57 | 43 | 1,500 |

To synthesize the colorant concentrates to be employed in this invention, the appropriate relative quantities of the respective ingredients, as set forth in Table 2, are placed in a suitable melting receptacle, for example a metallic or refractory crucible, and then heated above the liquidus temperature of the composition to effectuate melting or liquification of the ingredients. Unit melters or day tanks, both of which are well known, may also be employed. Upon this liquification of the mixture, a stirring or mixing operation is preferably employed for purposes of producing a homogeneous colorant. As this invention alternately contemplates a molten colorant addition or a solid colorant addition, the homogenized molten mass may be directly added to a molten base glass or, in the latter case, a solid colorant is first produced and used at a later time as a forehearth additive. The solid colorant production is accomplished by simply cooling the molten mixture to room temperature whereby crystallization results, and subsequently grinding the resultant solid to a particulate mass. Additionally, if desired, a screening operation may be beneficially employed in conjunction with the grinding operation to ensure the production of small size particles which greatly facilitates their solution and melting upon addition to a molten base glass. In this regard, use of a 100–150 mesh screen has produced acceptable results.

Generally, the base glass issues from the melting tank or refiner and enters the forehearth at a temperature of from 1260° C. to 1430° C. and this temperature is well adapted for the introduction of the additive colorant concentrate as either a melt or particulate crystallized solid. However, as will be noted by reference to Table 2, Samples 1 and 9, essentially comprising 22 percent Cr₂O₃ and 78 percent CaO, and 57 percent Cr₂O₃ and 43 percent CaO respectively, possess liquids temperatures above the normal base glass temperatures noted above. Consequently, when utilizing these compositions, or compositions in which the chromic oxide resides in a proportion less than about 22% or more than about 57%, it is necessary that the base glass temperature be increased above the normal operating temperature to ensure the melting and solution of the concentrate when employed as a particulate solid or, in the case of a molten concentrate addition, to substantially preclude undesirable crystallization at the point of concentrate addition. For example, a concentrate containing about 15% Cr₂O₃ and 85% CaO has a liquidus temperature in excess of 1800° C.; to use this composition would be economically unadvisable as it would generally require the molten base glass to be maintained substantially above the normal operating range of 1260° C.–1430° C.

Samples 2 through and including Sample 8, i.e. those compositions wherein the chromic oxide colorant resides in a proportion of about 26 to 56 percent by weight, represent the broadly preferred concentrate compositions as their liquidus temperatures are within the normal base glass temperature range and therefore do not require any temperature increases for their utilization as forehearth colorants. Thus, colorant concentrates represented by these compositions may be added, as either a molten mass or particulate solid, directly into the molten base glass of the forehearth without any modification of the normal operating conditions. Furthermore, because of the highly concentrated nature of the colorants employed, only small quantities are needed to produce the desired color depth of the final product. This fact, specifically with respect to the addition of solid concentrates, has the advantage of virtually eliminating substantial temperature changes in the forehearth as only a proportionately small quantum of heat is needed to melt and dissolve the concentrate.

Those compositions of the concentrate ranging from 46 percent chromic oxide and 54 percent calcium oxide to 53 percent chromic oxide and 47 percent calcium oxide represent the more narrowly preferred compositional range, with a composition of about 48 percent chromic oxide and 52 percent calcium oxide being especially preferred when employing the colorant as a particulate solid additive. In addition to the characteristics of having liquidus temperatures below the general temperature range of the molten base glass in the forehearth, these compositions have been found to possess beneficial viscosity and surface tension characteristics. That is, when molten concentrates within the ranges defined by Samples 4 and 6 of Table 2 are added to a molten base glass passing through a forehearth, a homogeneous uniformly colored glass can be produced in short time because of the high miscibility of these compositions with the base glass.

As noted supra, the preparation of a solid colorant concentrate includes the step of cooling the homogenized molten mass, whereby crystallization results. In this crystallization step, Sample 4 containing about 46 percent chromic oxide and 54 percent calcium oxide, and Sample 6, containing about 53 percent chromic oxide and 47 percent calcium oxide, produce eutectic compositions having liquidus temperatures of about 1170° C. and 1020° C. respectively, while Sample 5 produces a congruent melting composition having a liquidus temperature of about 1230° C. For a further understanding of the crystallization see Levin, E. M. et al. "Phase Diagrams for Ceramists," Part A–II (American Ceramic Society, 1964) p. 48 which is hereby incorporated by reference. The congruent melting composition containing about 48 percent chromic oxide and 52 percent calcium oxide is particularly well adapted for use as a solid forehearth colorant because it has been found to possess a high rate of solution in the base glass. This characteristic, supplemented by a relatively low liquidus temperature, thus allows rapid and expedient production of a homogeneous colored glass. The eutectic concentrate compositions, as well as concentrates having compositions between the congruent melting composition (Sample 5) and the respective eutectics (Samples 4 and 6 respectively) also, though to a somewhat lesser degree, possess the beneficial high solution rate of the congruent melting composition because, upon cooling a molten mass of these compositions, crystals of the congruent melting composition are also formed, notwithstanding the fact that the overall composition is other than the congruent composition. Consequently, color concentrates having compositions represented by either Samples 4 or 6 in Table 2, or concentrates having overall compositions intermediate Samples 4 and 5 or Samples 5 and 6, when added to the forehearth as a solid particulate substance will rapidly result in a homogeneous colored glass, because, in addition to having liquidus temperatures well below the normal base glass temperature, they inherently include as a fractional part of their overall composition, crystals having a high rate of solution in the base glass, i.e. congruent melting crystals.

From the foregoing, it should be readily apparent that the improvement in glass coloration techniques contemplated by this invention is practiced by adding either a particulate solid or molten coloring agent at a point exterior to the glass melting tank, wherein said coloring agent essentially comprises a homogeneous mixture of chromic oxide and calcium oxide, said chromic oxide and calcium oxide preferably being in a weight ratio of about 0.85–1.13:1. Ordinarily, in glass manufacturing practice the addition will most conveniently be made, on a continuous basis, to the pool of molten glass in the forehearth shortly after it issues from a main melting tank. Where advantageous however, the method of this invention may be practiced as a batch process as well, the coloring agent being added to a priorly melted batch or being added as a glass forming-coloring ingredient to the normal glass forming batch composition prior to melting.

Distribution of the color concentrate in the molten base glass may be accomplished by any suitable means, as by introducing a stirring device into the pool of glass or by adding the color concentrate while the glass is being drawn and moved through a confined area such that flaw and slip within the glass produces a homogeneous mixture. The locus and manner of mixing will readily be selected by those skilled in the art and the particular method of addition will depend on the apparatus available.

The amount of color concentrate to be added to the base glass will be determined by numerous parameters such as the quantum of molten base glass, its flow rate through the forehearth, the concentration of chromic oxide in the concentrate, and the depth of coloration desired in the final product. The proportions to be employed with any selected set of parameters can readily be ascertained by one having ordinary skill in the art of forehearth coloration techniques.

To facilitate the duplication of this invention, but by no means intended as a limitation on its scope, Table 3 represents a general summary of the proportions of base glass and colorant concentrate which may be used. The figures are based on a concentrate composition of about 48% $Cr_2O_3$ and 52% CaO, the sources of the ingredients used for this composition being J. T. Baker Chemical Company and Fischer Scientific Company, as noted supra. Additionally, the molten base glass employed had the following general composition: 72.7% $SiO_2$, 1.3% $Al_2O_3$, 11.5% CaO+MgO, 14.3% $Na_2O$, and 0.2% $K_2O$.

TABLE 3

| Sample | Base glass (wt. units) | Concentrate (wt. units) | Ratio of base glass to concentrate | Final percent $Cr_2O_3$ |
|---|---|---|---|---|
| 1 | 97.27 | 2.73 | 36:1 | 1.3 |
| 2 | 99.96 | 2.04 | 49:1 | .95 |
| 3 | 98.10 | 1.90 | 52:1 | .90 |
| 4 | 99.37 | .63 | 158:1 | .29 |
| 5 | 99.58 | .42 | 237:1 | .20 |
| 6 | 99.69 | .31 | 322:1 | .15 |
| 7 | 99.87 | .13 | 767:1 | .06 |
| 8 | 99.96 | .04 | 2,490:1 | .02 |

While the samples above show final percentages of $Cr_2O_3$ ranging from .02–1.3 percent by weight and will produce a wide range of green colors, in commercial practice the range most commonly employed is defined by Samples 5 and 8. That is, for a light green bottle or container enough color concentrate will be added to produce about a 0.02% concentration of $Cr_2O_3$ in the resulting glass, for the exemplary compositions this means about 1 part concentrate per 2490 parts base glass. On the other hand, for an emerald green bottle about 1 part concentrate per 237 parts base glass will be added to produce a final product concentration of about 0.20% $Cr_2O_3$.

While the invention has been described with reference to various particularly preferred embodiments, it will be appreciated that variations and modifications can be made within the scope of the following claims.

I claim:

1. A method for coloring a molten base glass which comprises synthesizing a colorant concentrate by heating a mixture consisting essentially of calcium oxide and chromic oxide in the weight proportions of about 22 to 57 percent chromic oxide and about 43 to 78 percent calcium oxide at a temperature above the liquidus temperature of said mixture, and adding said colorant concentrate to said molten base glass.

2. The method of claim 1 wherein the weight proportions of calcium oxide and chromium oxide in said mixture are in the range of about 46 to 53 percent chromic oxide and about 47 to 54 percent calcium oxide.

3. The method of claim 2 wherein said mixture consists essentially of about 48 weight percent chromic oxide and about 52 weight percent calcium oxide.

4. A method for coloring a molten base glass which comprises adding a synthesized reacted colorant concentrate composition consisting essentially of about 22 to 57 weight percent chromic oxide and about 43 to 78 weight percent calcium oxide to said molten base glass.

5. The method of claim 4 wherein said composition consists essentially of about 26 to 56 weight percent chromic oxide and about 44 to 74 weight percent calcium oxide.

6. The method of claim 5 wherein said composition consists essentially of about 46 to 53 weight percent chromic oxide and about 47 to 54 weight percent calcium oxide.

7. The method of claim 6 wherein said colorant composition is a congruent melting compound consisting essentially of about 48 weight percent chromic oxide and about 52 weight percent calcium oxide.

8. The method of claim 6 wherein said colorant composition is added in a molten form.

9. The method of claim 6 wherein said colorant composition is added in a solid form.

10. The method of claim 6 wherein said colorant composition is added to the molten base glass while maintaining said base glass at a temperature in excess of the liquidus temperature of said colorant.

11. A method for coloring a molten base glass which comprises adding a synthesized colorant composition consisting essentially of about 22 to 57 weight percent chromic oxide and about 43 to 78 weight percent calcium oxide to said molten base glass, said colorant composition being synthesized by prereacting a mixture consisting essentially of about 22 to 57 weight percent chromic oxide and about 43 to 78 weight percent calcium oxide at a temperature above the liquidus temperature of said mixture.

12. The method of claim 11 wherein the weight ratio of chromic oxide to calcium oxide in said colorant and said mixture is about 0.85 to 1.13:1.

13. In a method of making a colored glass by producing a molten base glass, adding a coloring agent to said molten base glass and mixing said coloring agent and said base glass to produce a homogeneous colored glass, the improvement wherein said coloring agent is a synthesized colorant composition consisting of chromic oxide and calcium oxide, said colorant being synthesized by prereacting a mixture consisting of at least about 22 weight percent chromic oxide and at least about 43 weight percent calcium oxide at a temperature above the liquidus temperature of said mixture.

References Cited

UNITED STATES PATENTS

| 3,343,935 | 9/1967 | Keefer et al. | 65—121 |
| 2,916,387 | 12/1959 | Commons | 65—134UX |
| 2,923,636 | 2/1960 | Swain | 65—134UX |
| 3,463,627 | 8/1969 | Le Blanc | 65—134 |

S. LEON BASHORE, Primary Examiner

J. B. HARDAWAY, Assistant Examiner

U.S. Cl. X.R.

65—134; 106—39, 48, 52, 53, 54